United States Patent
Meiri et al.

(10) Patent No.: US 10,866,735 B2
(45) Date of Patent: Dec. 15, 2020

(54) STORAGE SYSTEM WITH VARIABLE GRANULARITY COUNTERS

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 16/365,107

(22) Filed: Mar. 26, 2019

(65) Prior Publication Data
US 2020/0310654 A1    Oct. 1, 2020

(51) Int. Cl.
G06F 3/06            (2006.01)

(52) U.S. Cl.
CPC ............ *G06F 3/0607* (2013.01); *G06F 3/064* (2013.01); *G06F 3/067* (2013.01); *G06F 3/0632* (2013.01); *G06F 3/0649* (2013.01); *G06F 3/0653* (2013.01)

(58) Field of Classification Search
CPC ...... G06F 3/0607; G06F 3/0632; G06F 3/064; G06F 3/0649; G06F 3/0653; G06F 3/067; G06F 16/2246; G06F 21/6218; G06F 16/9027; G06F 16/322; G06F 17/18; G06F 16/2456; G06F 16/51; G06F 9/505; G06F 12/0238; G06F 12/0868; G06F 16/24561;
(Continued)

(56) References Cited

U.S. PATENT DOCUMENTS

| | | | |
|---|---|---|---|
| 7,203,963 B1 * | 4/2007 | Wu | G06F 21/552 709/224 |
| 7,444,464 B2 | 10/2008 | Urmston et al. | |
| 8,095,726 B1 | 1/2012 | O'Connell et al. | |

(Continued)

FOREIGN PATENT DOCUMENTS

WO      2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.

(Continued)

*Primary Examiner* — David Yi
*Assistant Examiner* — Tahilba O Puche
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured to establish an initial assignment of a plurality of counters to leaf nodes of a tree structure where each such leaf node represents a particular block size, to monitor count values of respective ones of the counters associated with the leaf nodes, to split at least a given one of the leaf nodes into multiple leaf nodes, each representing a block size smaller than the particular block size, responsive to the monitored count for its corresponding counter exceeding a split threshold, the given leaf node thereby being transformed into a non-leaf parent node of the multiple leaf nodes, and to modify the assignment of the plurality of counters to the leaf nodes responsive to the splitting. The multiple leaf nodes may be subsequently merged to recreate the given leaf node.

20 Claims, 5 Drawing Sheets

(58) Field of Classification Search
CPC ............. G06F 16/41; G06F 2212/1016; G06F 16/185; G06F 3/061; G06F 3/0689
See application file for complete search history.

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,372,879 | B1 * | 6/2016 | Evenson ............. G06F 16/9027 |
| 9,552,258 | B2 | 1/2017 | Hallak et al. |
| 9,606,870 | B1 | 3/2017 | Meiri et al. |
| 9,716,754 | B2 | 7/2017 | Swift |
| 2008/0065672 | A1 * | 3/2008 | Bamford ............. G06F 16/2246 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0318126 | A1 * | 11/2013 | Graefe ................ G06F 16/2246 707/797 |
| 2013/0325824 | A1 | 12/2013 | Shoens |
| 2014/0181016 | A1 | 6/2014 | Whitehead et al. |
| 2014/0365722 | A1 * | 12/2014 | Yi .......................... G06F 3/061 711/103 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

STORAGE SYSTEM WITH VARIABLE GRANULARITY COUNTERS

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. However, conventional counters used in these and other data movement applications within a storage system are typically implemented as fixed granularity counters for a particular predetermined block size. Such arrangements are unduly inflexible, leading to excessive memory usage for counter storage while also limiting the storage system performance improvements that are achievable through use of counter-based data movement techniques.

SUMMARY

Illustrative embodiments of the present disclosure provide variable granularity counters suitable for implementation in a storage array or other type of storage system, as well as in numerous other applications. For example, some embodiments are configured to utilize the variable granularity counters in conjunction with controlling movement of data between storage tiers of a multi-tier storage system and/or between a given storage tier and a cache memory. The variable granularity counters in illustrative embodiments utilize a tree structure to control dynamic variations in counter granularity over time responsive to monitored count values. Such an arrangement ensures that the counters used for particular data blocks are automatically provided with granularities that vary in accordance with the actual access patterns of those data blocks. As a result, excessive memory usage for counter storage is avoided, and storage system performance is improved.

An apparatus in one embodiment comprises at least one processing device comprising a processor coupled to a memory. The processing device is configured to establish an initial assignment of a plurality of counters to leaf nodes of a tree structure where each such leaf node represents a particular block size, to monitor count values of respective ones of the counters associated with the leaf nodes, to split at least a given one of the leaf nodes into multiple leaf nodes, each representing a block size smaller than the particular block size, responsive to the monitored count for its corresponding counter exceeding a split threshold, the given leaf node thereby being transformed into a non-leaf parent node of the multiple leaf nodes, and to modify the assignment of the plurality of counters to the leaf nodes responsive to the splitting.

For example, splitting at least a given one of the leaf nodes into multiple leaf nodes illustratively comprises splitting the given leaf node into multiple leaf nodes responsive to a corresponding data block having the particular block size being accessed more than a specified number of times within a specified period of time.

In some embodiments, the given leaf node illustratively represents a data block having the particular block size, and the splitting of the given leaf node results in n leaf nodes each representing a different portion of the data block and each having a block size given by the particular block size divided by n.

The processing device is further configured to merge the multiple leaf nodes responsive to monitored counts for respective ones of the multiple leaf nodes each being below a merge threshold. The non-leaf parent node is thereby transformed back into the given leaf node that had been previously split into the multiple leaf nodes. The assignment of the plurality of counters to the leaf nodes is modified responsive to the merging.

In embodiments in which the apparatus comprises a multi-tier storage system, the processing device illustratively implements at least a portion of a storage controller of the storage system. The storage controller in an embodiment of this type is configured to move data blocks between the storage tiers based at least in part on the monitored counts of the variable granularity counters.

Such movement of data blocks based at least in part on the monitored counts of the variable granularity counters can additionally or alternatively comprise movement of data blocks into and out of at least one cache memory. For example, in embodiments in which the storage system comprises a cache memory and at least one non-cache storage tier, the storage controller is illustratively configured to move data blocks between the non-cache storage tier and the cache memory based at least in part on the monitored counts.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
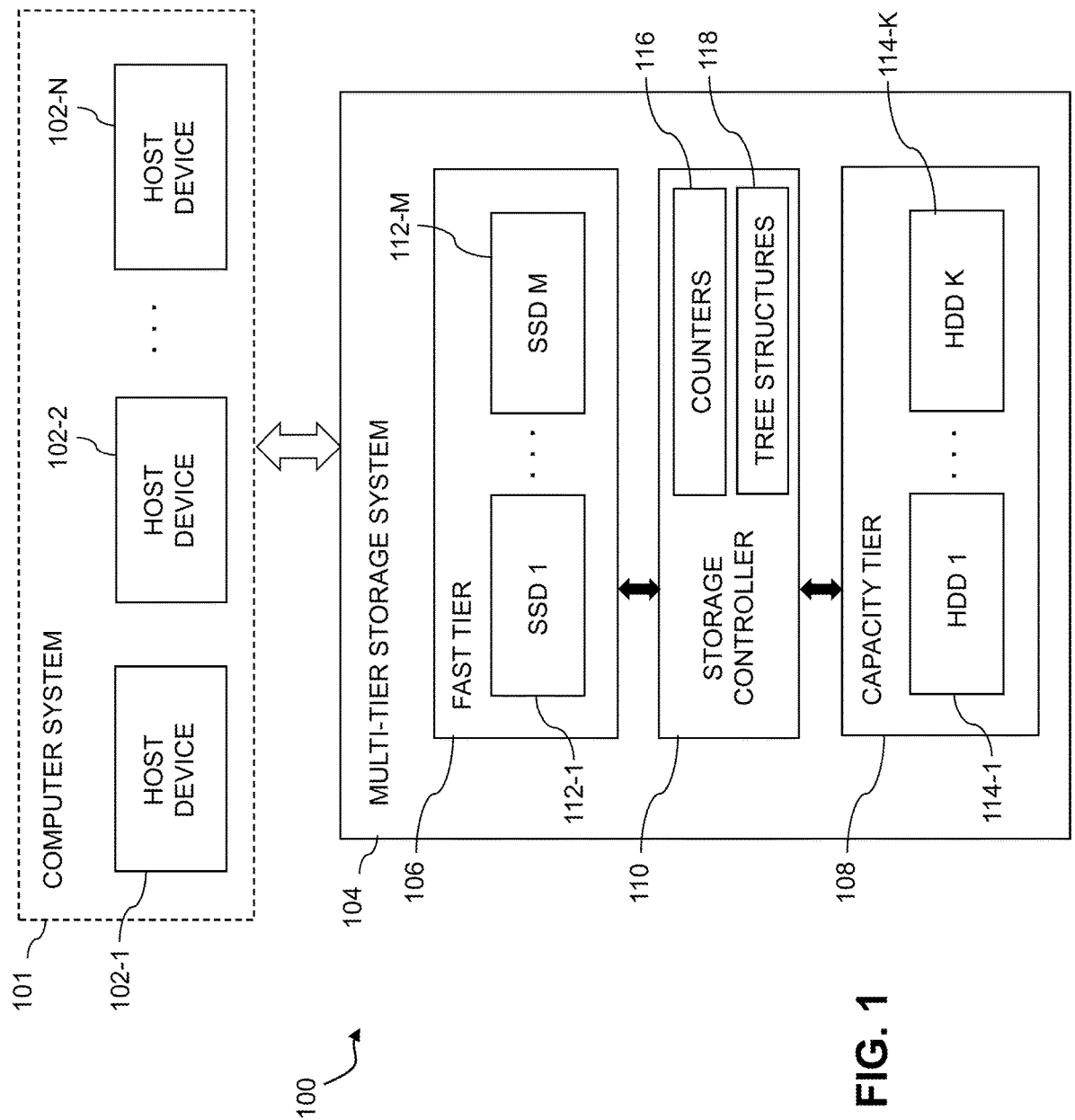
FIG. 1 is a block diagram of an information processing system comprising a storage system configured with variable granularity counters in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate with a multi-tier storage system 104 over one or more networks that are not explicitly shown in the figure.

The computer system 101 is assumed to comprise an enterprise computer system, cloud-based computer system or other arrangement of multiple compute nodes associated with respective users, with the compute nodes being implemented utilizing the host devices 102. The host devices 102 of the computer system 101 in some embodiments illustratively provide compute services such as execution of one or more applications on behalf of each of one or more users associated with respective ones of the host devices 102.

The host devices 102 and storage system 104 illustratively comprise respective processing devices of one or more processing platforms. For example, the host devices 102 and the storage system 104 can each comprise one or more processing devices each having a processor and a memory, possibly implementing virtual machines and/or containers, although numerous other configurations are possible.

The host devices 102 and the storage system 104 can additionally or alternatively be part of cloud infrastructure such as an Amazon Web Services (AWS) system. Other examples of cloud-based systems that can be used to provide one or more of host devices 102 and storage system 104 include Google Cloud Platform (GCP) and Microsoft Azure.

The host devices 102 and the storage system 104 may be implemented on a common processing platform, or on separate processing platforms.

The host devices 102 are configured to write data to and read data from the storage system 104 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

A given network or set of networks over which the host devices 102 and the storage system 104 communicate is assumed to comprise a portion of a global computer network such as the Internet, although other types of networks can be used in system 100, including a wide area network (WAN), a local area network (LAN), a satellite network, a telephone or cable network, a cellular network, a wireless network such as a WiFi or WiMAX network, or various portions or combinations of these and other types of networks. The one or more networks in some embodiments therefore comprise combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel, possibly involving remote direct memory access (RDMA) connections. Numerous alternative networking arrangements are possible in a given embodiment, as will be appreciated by those skilled in the art.

The multi-tier storage system 104 in the present embodiment comprises a fast tier 106, a capacity tier 108 and a storage controller 110. The fast tier 106 is an example of what is more generally referred to herein as a "front-end storage tier" or still more generally a "first storage tier" of the multi-tier storage system 104. The capacity tier 108 is an example of what is more generally referred to herein as a "back-end storage tier" or still more generally a "second storage tier" of the multi-tier storage system 104. Other types and arrangements of two or more storage tiers can be used in other embodiments. Each of the fast tier 106 and the capacity tier 108 is assumed to comprise a plurality of storage devices.

The fast tier 106 of the multi-tier storage system 104 in the present embodiment illustratively comprises a plurality of solid state drives (SSDs) 112-1 through 112-M. The SSDs 112 of the fast tier 106 in some implementations more particularly comprise non-volatile memory (NVM) devices. Examples of such storage devices include flash memory devices, 3D XPoint devices, non-volatile random access memory (NVRAM) devices, or other types of non-volatile memory devices including phase-change RAM (PC-RAM) and magnetic RAM (MRAM). Various combinations of multiple different types of volatile or non-volatile memory devices may also be used.

The capacity tier 108 in this embodiment illustratively comprises a plurality of hard disk drives (HDDs) 114-1, . . . 114-K. Additional or alternative types of storage devices that may be implemented in the capacity tier 108 include other types of disk-based or electronic memory devices.

Numerous other arrangements of multiple storage tiers implemented using various types and arrangements of storage devices are possible in the multi-tier storage system 104. The particular tiers and storage devices shown in FIG. 1 are therefore presented by way of illustrative example only.

It is assumed that the fast tier 106 has a relatively high IO processing speed and a relatively low capacity and the capacity tier 108 has a relatively low IO processing speed and a relatively high capacity, although again other types of multi-tier storage systems can be used in other embodiments.

In some embodiments, the fast tier 106 is implemented at least in part using software-defined storage such as ScaleIO™ or ViPR® both of which are commercially available from Dell EMC of Hopkinton, Mass.

As another example, the fast tier 106 can comprise at least a portion of a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement at least portions of the fast tier 106 in other embodiments.

The capacity tier 108 in some embodiments is implemented at least in part utilizing a scale-out network-attached storage (NAS) cluster and/or an object store. For example, the capacity tier 108 can include a scale-out NAS cluster implemented using Isilon® platform nodes and associated accelerators in the S-Series, X-Series and NL-Series product lines, all commercially available from Dell EMC.

Additionally or alternatively, the capacity tier 108 can include an object store implemented using cloud storage such as Elastic Cloud Storage (ECS) from Dell EMC. Other examples of object stores that can be used in a given embodiment include object stores implemented using object-based storage products such as Atmos, also from Dell EMC.

The capacity tier 108 in some embodiments includes an object store that is part of the same cloud infrastructure that provides the host devices 102. Examples of cloud-based object stores that can be utilized for object store in some embodiments include Amazon Simple Storage Service (S3), GCP Cloud Storage, and Microsoft Azure Blob Storage.

A given such object store of the capacity tier 108 is configured to store a plurality of objects. Each of the objects stored in the object store is assumed to have a unique object identifier (OID). It is also possible that the capacity tier 108 could comprise multiple object stores, or other types of object storage.

Again, the fast tier 106, capacity tier 108 and storage controller 110 are all assumed to be part of the multi-tier storage system 104 of information processing system 100, although other arrangements are possible in other embodiments. For example, components such as storage controller 110 in other embodiments can be implemented at least in part externally to the multi-tier storage system 104.

Also, it should be noted that storage controller 110 that is shown as separate from the fast tier 106 and capacity tier 108 in the FIG. 1 embodiment can be implemented at least in part within at least one of the tiers. For example, at least portions of the storage controller 110 can be implemented in a distributed manner using storage nodes that are used to implement respective portions of at least one of the fast and capacity tiers.

The storage controller 110 comprises counters 116 and tree structures 118 that are collectively utilized to implement what are referred to herein as "variable granularity counters" for the storage system 104. Such components are illustratively implemented at least in part in the form of software running on a processing platform or processing device that implements the storage controller 110. The storage controller 110 itself may be implemented in one or more virtual machines and/or containers of the processing platform, or using other arrangements of physical or virtual processing devices.

The storage controller 110 is illustratively coupled to the fast tier 106 and the capacity tier 108 and configured to control data movement between these storage tiers. More particularly, the storage controller 110 is configured to move data between the fast tier 106 and the capacity tier 108, for example, by moving data pages or other types of data blocks between the SSDs 112 of the fast tier 106 and the HDDs 114 of the capacity tier 108. For example, the storage controller 110 may be configured to control movement of data between the fast tier 106 and the capacity tier 108 in order to facilitate achievement of desired levels of performance by system users, or to satisfy other performance goals. As will be described in more detail below, such data movement is based at least in part on monitored count values of particular ones of the counters 116 assigned to respective leaf nodes of a given one of the tree structures 118. The term "data movement" as used in this and other contexts herein is intended to be broadly construed, so as to encompass data relocation as well as other types of movement of data between storage tiers of a multi-tier storage system.

As indicated above, the storage devices utilized in the fast tier 106 are generally significantly faster in terms of read and write access times than the storage devices utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Such alternative arrangements can include, for example, one or more intermediate storage tiers arranged between the front-end and back-end storage tiers of a multi-tier storage system 104.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

A given "storage system" should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage controller 110 and storage system 104 should also be understood to include additional modules and other components typically found in conventional implementations of storage controllers and storage systems, although such additional modules and other components are omitted from the figure for clarity and simplicity of illustration.

As mentioned previously, the storage controller 110 utilizes the counters 116 and the tree structures 118 to implement variable granularity counters for use in controlling movement of data within the multi-tier storage system 104.

In implementing a given set of variable granularity counters in storage system 104, the storage controller 110 is configured to establish an initial assignment of a plurality of the counters 116 to leaf nodes of a given one of the tree structures 118, where each such leaf node represents a particular block size, and to monitor count values of respective ones of the counters 116 assigned to the leaf nodes. The initial assignment of the counters to the leaf nodes illustratively provides a substantially equal distribution of the counters across the leaf nodes, although other types of initial assignments may be used.

The storage controller 110 splits at least a given one of the leaf nodes into multiple leaf nodes, each representing a block size smaller than the particular block size, responsive to the monitored count for its corresponding counter exceeding a split threshold. The given leaf node is thereby transformed into a non-leaf parent node of the multiple leaf nodes. The storage controller 110 also modifies the assignment of the plurality of counters to the leaf nodes responsive to the splitting.

In some embodiments, splitting at least a given one of the leaf nodes into multiple leaf nodes comprises splitting the given leaf node into multiple leaf nodes responsive to a corresponding data block having the particular block size being accessed more than a specified number of times within a specified period of time.

Terms such as "responsive to" as used herein are intended to be broadly construed, and should not be interpreted as requiring any particular amount of time between a detected event and a corresponding action taken. For example, the action need not occur immediately upon detection of the event.

Also, references herein to "exceeding" a threshold should be construed broadly so as to further encompass, in some illustrative embodiments, being "at or above" the threshold. Thus, for example, an action in some embodiments can be taken based on meeting or exceeding a split threshold. References such as "exceeding" a threshold can therefore be broadly interpreted as encompassing, for example, meeting or exceeding a threshold. Other thresholds herein can be similarly broadly construed. The particular meaning attributed to a given threshold can be varied depending upon the implementation.

The given leaf node subject to splitting as described above illustratively represents a data block having the particular block size and the splitting of the given leaf node results in n leaf nodes each representing a different portion of the data block and each having a block size given by the particular block size divided by n.

In some embodiments, modifying the assignment of the plurality of counters to the leaf nodes responsive to the splitting comprises releasing for reassignment the counter assigned to the given leaf node, and assigning at least one counter to each of the multiple leaf nodes into which the given leaf node was split.

Figure 2:
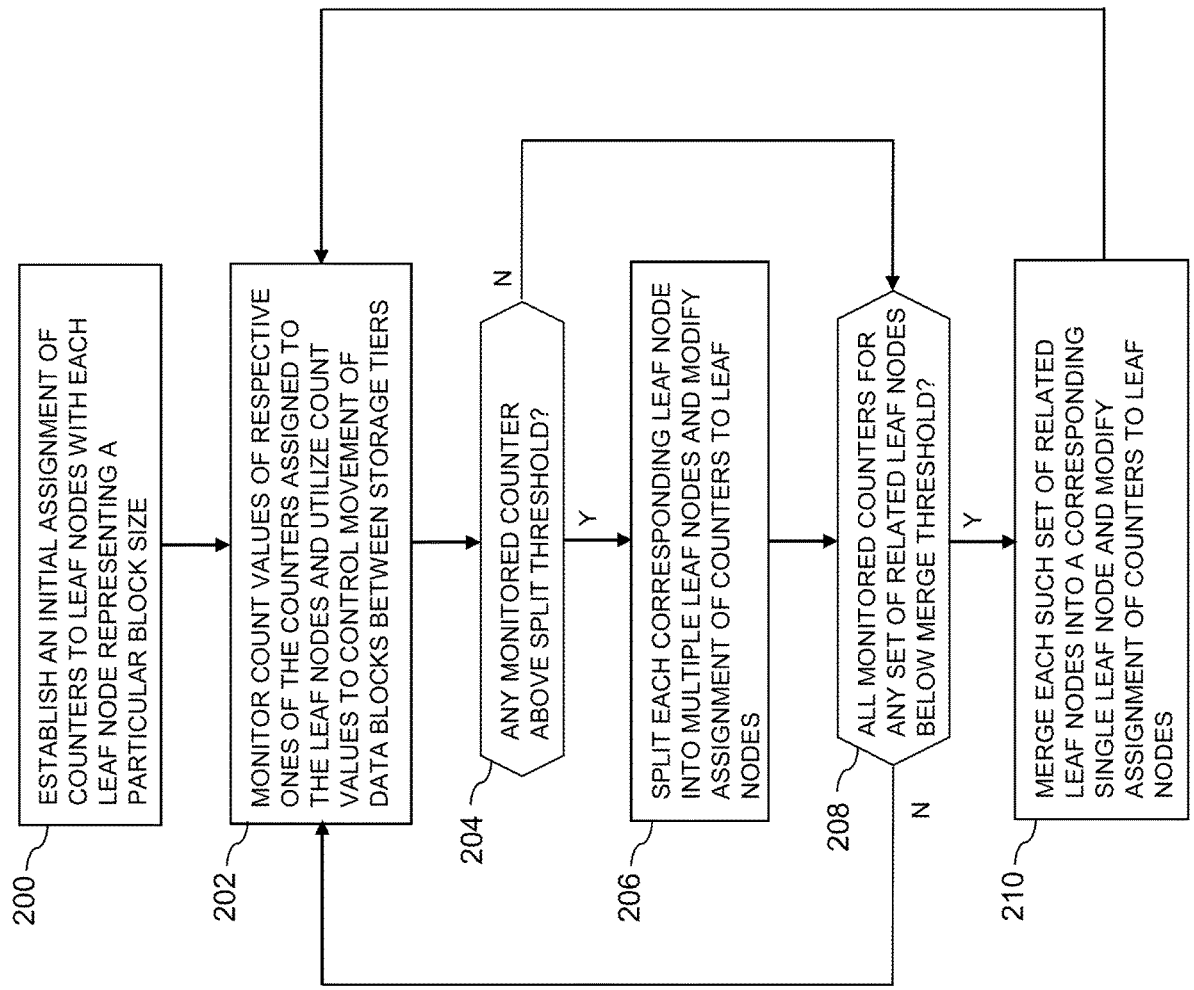
FIG. 2 is a flow diagram of a process for implementing variable granularity counters in an illustrative embodiment.
Figure 3:
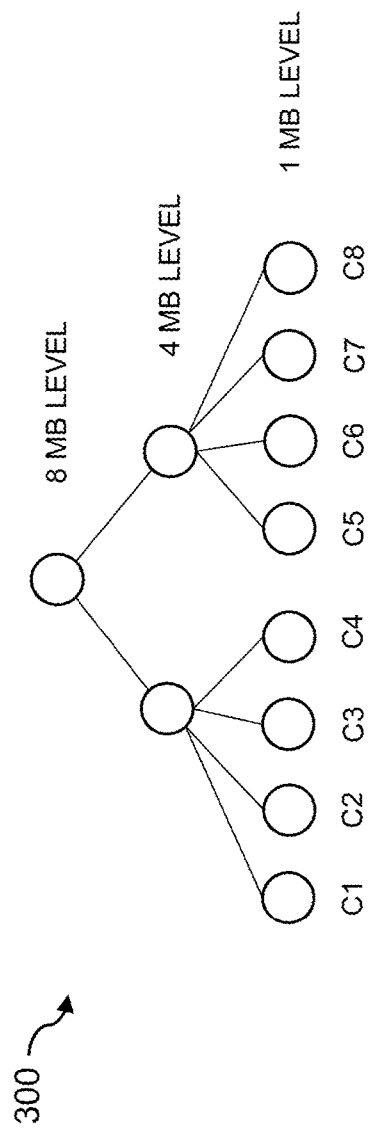
FIGS. 3 and 4 show examples of tree structures utilized to provide variable granularity counters in an illustrative embodiment.
Figure 4:
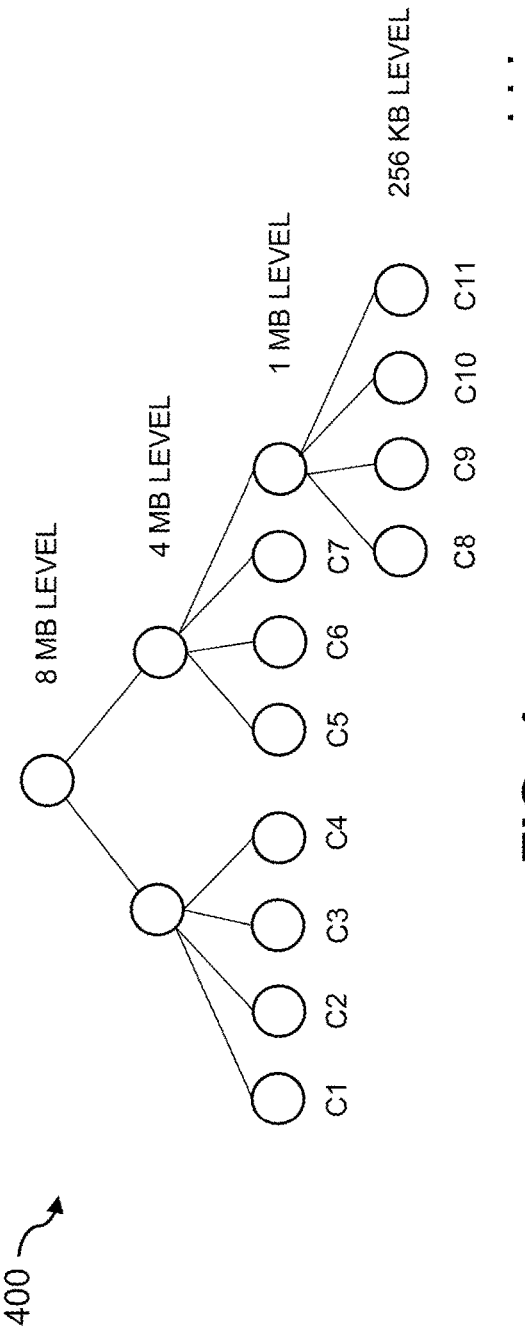

Examples of respective initial and modified assignments of counters to leaf nodes of a tree structure are shown in FIGS. 3 and 4, and will be described in more detail below in conjunction with the flow diagram of FIG. 2.

The counters are illustratively assigned to the leaf nodes in accordance with the initial assignment and the modified assignment from a fixed-size set of counters, such as from a designated subset of the counters 116.

The splitting of the given leaf node into multiple leaf nodes coupled with the modified assignment of counters to the leaf nodes effectively provides variable granularity counters for a given data block having the particular block size. In other words, the given data block after the splitting of its corresponding leaf node into multiple leaf nodes can now have accesses to different portions thereof tracked separately using individual counters assigned to the respective multiple leaf nodes, thereby providing a higher resolution or finer granularity in the tracking of accesses to the given data block.

The storage controller 110 is further configured to merge the multiple leaf nodes responsive to monitored counts for respective ones of the multiple leaf nodes each being below a merge threshold. This merging transforms the non-leaf parent node of the multiple leaf nodes back into the given leaf node that had been previously split into the multiple leaf nodes. The storage controller 110 modifies the assignment of the plurality of counters to the leaf nodes responsive to the merging. Such merging similarly provides an adjustment in the counter granularity, but in this case by decreasing the number of separate counters associated with the given data block corresponding to the merged leaf node.

In some embodiments, modifying the assignment of the plurality of counters to the leaf nodes responsive to the merging comprises releasing for reassignment the counters assigned to respective ones of the multiple leaf nodes that were merged, and assigning at least one counter to the given leaf node recreated from the merging of the multiple leaf nodes.

Similar splitting and merging operations are performed for other leaf nodes of the tree structure responsive to variation in the monitored counts relative to the specified split and merge thresholds. These operations collectively provide variable granularity counters for each of a plurality of data blocks of the storage system 104.

In some embodiments, establishing an initial assignment of a plurality of counters to the leaf nodes comprises assigning a same number of the counters to each of at least a subset of the leaf nodes. For example, a single counter or a particular fixed number of counters may be initially assigned to each leaf node of the tree structure. Different numbers of counters may be assigned to different ones of the leaf nodes. Non-leaf nodes of the tree structure are not assigned any counters in illustrative embodiments.

As a more particular example, three counters can be assigned to each leaf node, including separate read, write and copy counters, each counting respective read, write and copy accesses to the corresponding data block. These and other similar counters are also referred to herein as IO counters.

Additional counters can be assigned to count other parameters associated with access to a given data block. For example, multiple write counters can be used to track accesses associated with different IO sizes, such as write counters for respective IO size ranges of 0-16 KB, 16-32 KB, and above 32 KB.

Numerous other arrangements of multiple counters can be used, each counting a different measurable quantity for the given data block. For example, counters of different sizes and types can be assigned to different ones of the leaf nodes.

Each of the leaf nodes illustratively corresponds to a different data block stored within the storage system 104. A given such data block is illustratively stored in a particular one of the fast tier 106 and the capacity tier 108, and subject to movement between the tiers based on monitored count values of the counters assigned to its one or more corresponding leaf nodes.

Other types of data movement can be supported within the storage system 104. For example, in some embodiments, the storage system 104 further comprises at least one cache memory, and the storage controller 110 is configured to move data blocks between a given one of the storage tiers 106 and 108 and the cache memory based at least in part on the monitored count values. Alternative arrangements are possible, such as arrangements involving multiple cache memories and one or more storage tiers. In some embodiments, a cache memory can be considered one of the storage tiers of a multi-tier storage system.

In some embodiments, access frequency is used to control movement of data pages or other data blocks between storage tiers and/or cache memory. For example, a 1 MB address range of a particular storage volume, where some IO counters exceed certain thresholds, may be promoted to cache memory. Similarly, a 1 MB address range of the particular storage volume, currently in cache memory, where some IO counters are below certain thresholds, may be demoted back to a designated storage tier. The counter granularity of the address ranges in illustrative embodiments herein changes based on access patterns. High granularity counters, such as IO counters assigned to respective 4 KB data pages, provide additional information and allow efficient promoting and demoting of data blocks without wasting cache memory space. Illustrative embodiments advantageously avoid the overhead costs associated with maintaining such high granularity counters for all data blocks, but instead dynamically adapt between high granularity and low granularity based on monitored counts.

The above-described splitting and merging of leaf nodes and the associated modifications in the assignments of the counters to the leaf nodes therefore facilitate the detection of "hot" or "cold" data blocks that should be promoted or demoted to a respective higher or lower tier of the multi-tier storage system 104, and/or moved into or removed from a cache memory of the storage system 104. Using fixed granularity counters for respective data blocks of relatively small size, such as 4 KB, would be unduly expensive in terms of the memory space consumed by the counters, but using fewer fixed granularity counters for larger data blocks, such as 1 MB data blocks, may not provide an appropriate level of resolution and storage system performance would suffer as a result. Illustrative embodiments described herein advantageously overcome such drawbacks of fixed granularity counters by providing variable granularity counters using a flexible tree structure in which counters are assigned to leaf nodes and the leaf nodes are split and merged responsive to monitored counts. The flexible tree structure disclosed in illustrative embodiments herein dynamically balances the conflicting requirements of memory space and accuracy in a particularly efficient manner.

The above-described operations carried out in conjunction with a process for providing variable granularity counters in the storage system 104 are illustratively performed at least in part under the control of the storage controller 110. As is apparent from the foregoing description, such operations utilize the counters 116 and tree structures 118.

The host devices 102 and storage system 104 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 104 may be implemented on respective distinct processing platforms, although numerous other arrangements are possible. For example, in some embodiments at least portions of the host devices 102 and the storage system 104 are implemented on the same processing platform. The storage system 104 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 104 to reside in different data centers. Numerous other distributed implementations of one or both of the host devices 102 and the storage system 104 are possible. Accordingly, the storage system 104 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, storage system 104, storage tiers 106 and 108, storage controller 110, counters 116 and tree structures 118 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for variable granularity counters can be implemented in one or more host devices, or partially in a host device and partially in a storage system. Accordingly, illustrative embodiments are not limited to arrangements in which all such variable granularity counter functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 210, and is suitable for use in system 100 but is more generally applicable to other types of information processing systems in which a storage system is configured to utilize counters to control movement of data. The steps are illustratively performed at least in part under the control of the storage controller 110 utilizing its counters 116 and tree structures 118.

In step 200, an initial assignment of counters to leaf nodes of a tree structure is established, with each leaf node representing a particular block size.

An example tree structure 300 having an initial assignment of counters to leaf nodes is shown in FIG. 3. In this example, the tree structure includes a root node at an 8 MB level, two branch nodes at a 4 MB level, and 8 leaf nodes at a 1 MB level. Counters C1, C2, C3, . . . C8 are assigned to respective ones of the 8 leaf nodes as shown. The counters are illustratively assigned from a pool of available counters, such as at least a subset of the counters 116 of the storage controller 110 of FIG. 1. The tree structure 300 is illustratively one of the tree structures 118 of storage controller 110 used to provide variable granularity counters using the techniques disclosed herein. The counters assigned to the respective leaf nodes at the 1 MB level in this example each represent a different 1 MB data block stored in the storage system. These counters track IO accesses to their respective data blocks.

The root node and branch nodes in the present example are used to maintain the tree structure but are not assigned any counters. Instead, only the leaf nodes are assigned counters. The nodes of the tree structure other than the leaf nodes are referred to herein as "non-leaf" nodes. The branch node that is the parent of a given set of multiple leaf nodes is more particularly referred to herein as a "non-leaf parent node." Also, the number of counters and respective data blocks in many practical applications will be significantly larger than as illustrated in this simplified example.

It is to be appreciated that this particular arrangement of nodes, counters and levels is presented by way of illustrative example only, and should not be construed as limiting in any way. As mentioned previously, other embodiments can include different features, such as multiple counters being assigned to each leaf node, or counters of different sizes and types being assigned to different ones of the leaf nodes.

In step 202, count values of respective ones of the counters assigned to the leaf nodes are monitored. The count values are utilized by a storage controller to control movement of data blocks between storage tiers. Additionally or alternatively, the count values may be utilized by the storage control to control movement of data blocks between a given storage tier and a cache memory of the storage system.

In step 204, a determination is made as to whether or not any of the monitored counters has a count value above a specified split threshold. If there is at least one monitored counter with a count value above the split threshold, the process moves to step 206, and otherwise bypasses step 206 and moves to step 208.

In step 206, each corresponding leaf node found to have a counter value above the split threshold in 204 is split into multiple leaf nodes. A given leaf node subject to such a split thereby becomes a non-leaf parent node of the multiple leaf nodes. As a result of the split, the number and arrangement of leaf nodes in the tree structure changes. The assignment of counters to the leaf nodes is therefore modified.

Returning to the previous tree structure example, a split of the leaf node corresponding to counter C8 at the 1 MB level is illustrated in the tree structure 400 of FIG. 4. The split operation generally detects a leaf node associated with a "hot" data block as a leaf node with an assigned counter having a count indicative of more than a specified number of accesses within a particular period of time (e.g., more than N hits in the last X seconds). Here, it is assumed that the counter C8 has exceeded such a split threshold, and is therefore split into 4 new leaf nodes as illustrated, each at a 256 KB level of the tree structure 400.

The assignment of the counters to the leaf nodes is modified as shown, with the four new leaf nodes at the 256 KB level being assigned respective counters C8, C9, C10 and C11. The leaf node that was previously assigned counter C8 in the tree structure 300 of FIG. 3 now becomes a non-leaf parent node of the four new leaf nodes. Their respective corresponding counters track accesses to respective different 256 KB data blocks of the original 1 MB data block, and therefore provide a higher granularity than the other counters C1 through C7 that remain assigned to respective leaf nodes at the 1 MB level.

One or more of the leaf nodes at the 256 KB level can be subject to further splitting based on monitored count values. Such leaf nodes can also be subject to merging back into their non-leaf parent node to recreate a single leaf node at the next higher level, as will now be described with reference again to the flow diagram of FIG. 2.

In step 208, a determination is made as to whether or not all monitored counters for any set of related leaf nodes sharing a common non-leaf parent node are below a specified merge threshold. If there is at least one such set of related leaf nodes for which all of the monitored counters are below the merge threshold, the process moves to step 210, and otherwise bypasses step 210 and returns directly to step 202 in order to continue monitoring count values and utilizing the count values to control movement of data blocks.

In step 210, each set of related leaf nodes for which the monitored counters are below the merge threshold is merged into a corresponding single leaf node, and the assignment of counters to leaf nodes is again modified. For example, a given leaf node that was previously split into related leaf nodes and thereby transformed into a non-leaf parent node, such as the leaf node assigned counter C8 in tree structure 300 of FIG. 3, may now be recreated through the merging of the related leaf nodes back into a single leaf node. The four leaf nodes each representing a different 256 KB data block in FIG. 4 are therefore illustratively merged back into a single leaf node representing the corresponding 1 MB data block, which after modification of the assignment of counters to leaf nodes results in a lower counter granularity for that data block. The process then returns to step 202 in order to continue monitoring count values and utilizing the count values to control movement of data blocks.

In implementing a merge of multiple leaf nodes back into their non-leaf parent node to recreate a single leaf node, current count values of the corresponding multiple counters may be combined and used as an initial count value for the counter that is assigned to the single leaf node. Other arrangements are possible. For example, counters may be initialized to zero when involved in a split or merge operation.

Additional split and merge operations can be applied over time as triggered by the particular values of the monitored counts for other leaf nodes of the tree structure, through operation of the FIG. 2 process as described above.

The FIG. 2 process continues for as long as the variable granularity counters are needed to control movement of data blocks within the storage system. The process can be terminated under various conditions, possibly by or under the control of the storage controller 110, such as a reconfiguration of the storage system 104.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing variable granularity counters. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different sets of variable granularity counters for respective different sets of one or more storage volumes of a given storage system or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 110 of storage system 104 that is configured to control performance of one or more steps of the FIG. 2 process in the system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 110, as well as other system components, may be implemented at least in part using processing devices of such processing platforms. For example, in a distributed implementation of the storage controller 110, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate variable granularity counters as disclosed herein.

Additionally or alternatively, the storage system 104 in some embodiments comprises a clustered storage system distributed over a plurality of storage nodes that are interconnected by one or more networks. Each such storage node of a clustered storage system of this type is assumed to be implemented using at least one processing device comprising a processor coupled to a memory.

The storage controller 110 in such an embodiment is implemented in a distributed manner so as to comprise a plurality of distributed storage controller components implemented on respective ones of the storage nodes. A storage controller of this type is referred to herein as a distributed storage controller.

Each of the storage nodes of the clustered storage system illustratively comprises a set of processing modules configured to communicate over one or more networks with corresponding sets of processing modules on other ones of the storage nodes. The sets of processing modules of the storage nodes collectively comprise at least a portion of the distributed storage controller of the clustered storage system.

For example, the modules of the distributed storage controller in some embodiments more particularly comprise a plurality of control modules, a plurality of data modules, a plurality of routing modules, and at least one management module.

In some implementations of this type, the control modules, data modules and routing modules of the distributed storage controller illustratively comprise respective C-modules, D-modules and R-modules of an otherwise conventional XtremIO™ storage array. The one or more management modules of the distributed storage controller in such arrangements illustratively comprise a system-wide management module ("SYM module") of the XtremIO™ storage array. Accordingly, variable granularity counters of a storage controller in some embodiments disclosed herein are implemented under the control of at least one system-wide management module of the distributed storage controller, utilizing the C-modules, D-modules and R-modules of the XtremIO™ storage array.

Additional details regarding clustered storage systems that can be configured to implement variable granularity counters can be found in U.S. Pat. No. 9,104,326, entitled "Scalable Block Data Storage Using Content Addressing," which is incorporated by reference herein.

Illustrative embodiments of a storage system or other type of processing device with variable granularity counters as disclosed herein can provide a number of significant advantages relative to conventional arrangements.

For example, some embodiments are configured to utilize the variable granularity counters in conjunction with controlling movement of data between storage tiers of a multi-tier storage system and/or between a given storage tier and a cache memory.

The variable granularity counters in illustrative embodiments utilize a tree structure to control dynamic variations in counter granularity over time responsive to monitored count values. Such an arrangement ensures that the counters used for particular data blocks are automatically provided with granularities that vary in accordance with the actual access patterns of those data blocks.

As a result, excessive memory usage for counter storage is avoided, and storage system performance is improved. Conventional approaches using fixed granularity counters either require excessive amounts of memory to provide high levels of granularity, or implement fewer counters and settle for access statistics that are too coarse and therefore fail to provide desired levels of storage system performance.

Functionality for variable granularity counters can be implemented in a storage system, in a host device, or partially in a storage system and partially in a host device. Numerous other implementations in other types of processing devices are possible. Embodiments are therefore not limited in terms of the particular type of processing device or devices in which the variable granularity counters are implemented.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with variable granularity counters will now be described in greater detail with reference to FIGS. 5 and 6. Although described in the context of system 100, these platforms may also be used to implement at least portions of other information processing systems in other embodiments.

Figure 5:
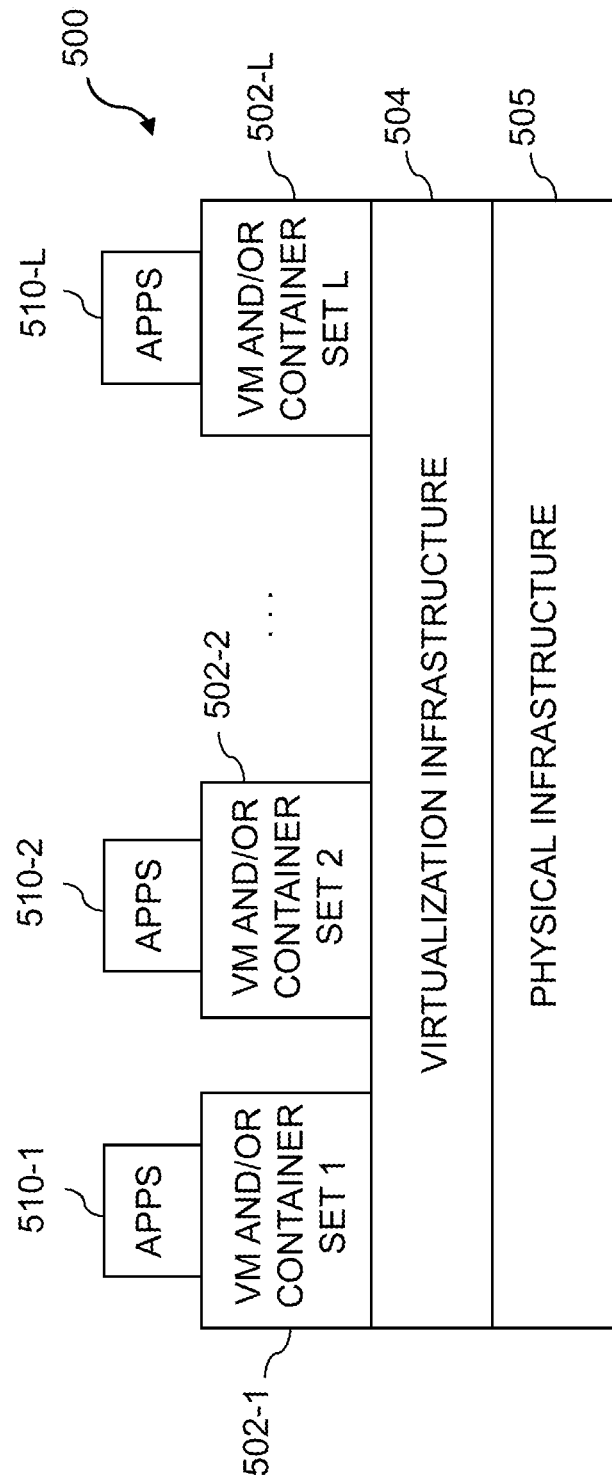
FIGS. 5 and 6 show examples of processing platforms that may be utilized to implement at least a portion of an information processing system in illustrative embodiments.
Figure 6:
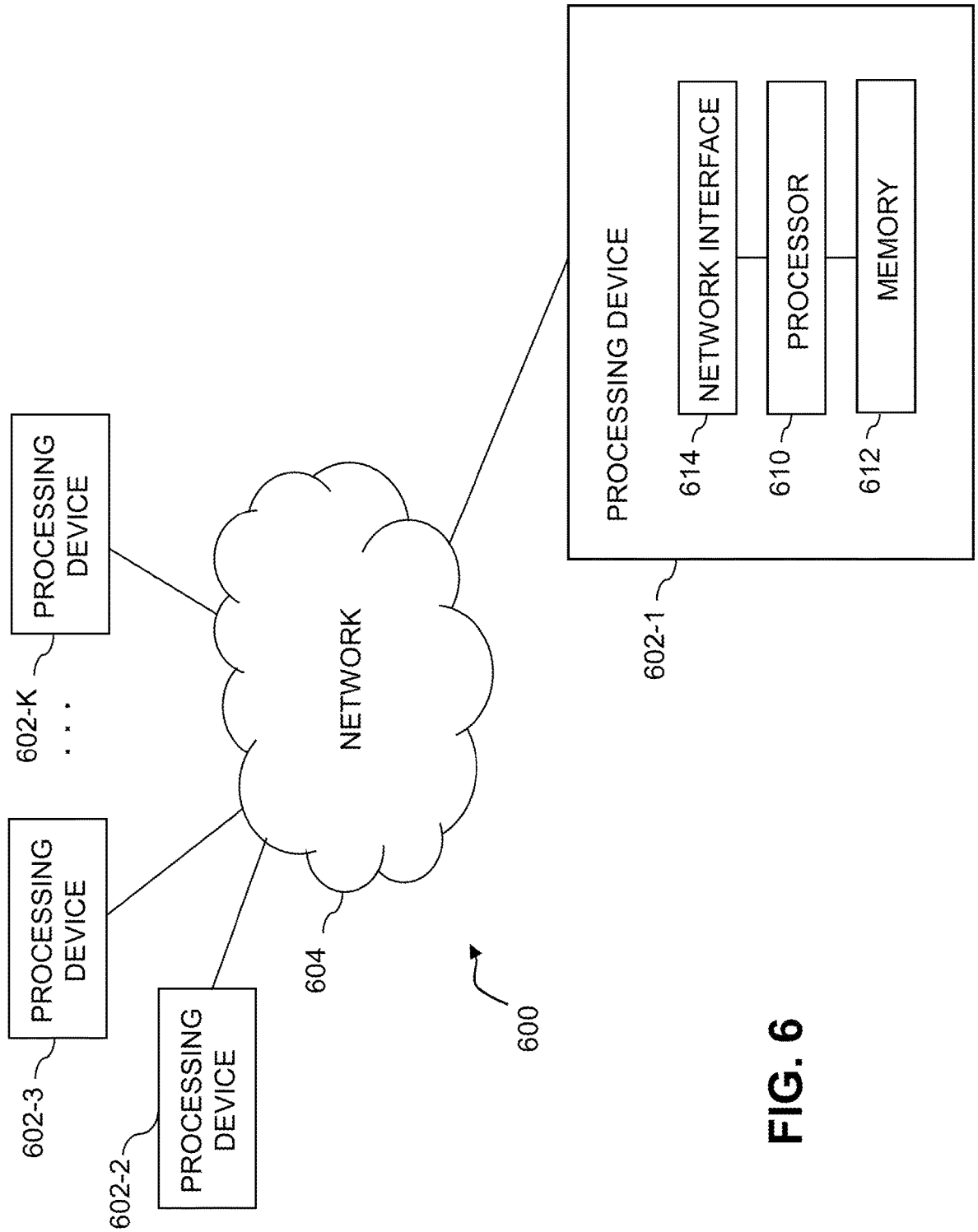

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide variable granularity counters of the type described above for one or more processes running on a given one of the VMs. For example, at least one of the VMs can implement a storage controller configured to provide variable granularity counters in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide variable granularity counters of the type described above. For example, a container host device supporting multiple containers of one or more container sets can implement a storage controller configured to provide variable granularity counters in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the variable granularity counters of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, variable granularity counters and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to establish an initial assignment of a plurality of counters to respective leaf nodes of a tree structure where each such leaf node represents a particular block size;
   to monitor count values of respective ones of the counters assigned to the respective leaf nodes;

to split at least a given one of the leaf nodes into multiple leaf nodes, each leaf node of the multiple leaf nodes representing a same block size smaller than the particular block size, responsive to the monitored count value for the corresponding counter of the given leaf node exceeding a split threshold, the given leaf node thereby being transformed into a non-leaf parent node of the multiple leaf nodes; and to modify the initial assignment of the plurality of counters to the leaf nodes responsive to the splitting.

2. The apparatus of claim 1 wherein said at least one processing device is further configured:

to merge the multiple leaf nodes responsive to each of their monitored counts being below a merge threshold, the non-leaf parent node thereby being transformed back into the given leaf node that had been previously split into the multiple leaf nodes; and to modify the initial assignment of the plurality of counters to the leaf nodes responsive to the merging.

3. The apparatus of claim 1 wherein establishing an initial assignment of a plurality of counters to the respective leaf nodes comprises assigning a same number of the counters to each of at least a subset of the leaf nodes.

4. The apparatus of claim 1 wherein establishing an initial assignment of a plurality of counters to the respective leaf nodes comprises assigning multiple ones of the counters to each of the leaf nodes.

5. The apparatus of claim 1 wherein said at least one processing device comprises a storage controller of a storage system that comprises a plurality of storage devices.

6. The apparatus of claim 5 wherein each of the leaf nodes corresponds to a different data block stored within the storage system.

7. The apparatus of claim 1 wherein splitting at least a given one of the leaf nodes into multiple leaf nodes comprises splitting the given leaf node into multiple leaf nodes responsive to a corresponding data block having the particular block size being accessed more than a specified number of times within a specified period of time.

8. The apparatus of claim 1 wherein modifying the initial assignment of the plurality of counters to the leaf nodes responsive to the splitting comprises:

releasing for reassignment the counter assigned to the given leaf node; and assigning at least one counter to each of the multiple leaf nodes into which the given leaf node was split.

9. The apparatus of claim 2 wherein modifying the initial assignment of the plurality of counters to the leaf nodes responsive to the merging comprises:

releasing for reassignment the counters assigned to respective ones of the multiple leaf nodes that were merged; and assigning at least one counter to the given leaf node recreated from the merging of the multiple leaf nodes.

10. The apparatus of claim 1 wherein the counters are assigned to the leaf nodes in accordance with the initial assignment and the modified assignment from a fixed-size set of counters.

11. The apparatus of claim 10 wherein the initial assignment of the counters to the leaf nodes provides an equal distribution of the counters across the leaf nodes.

12. The apparatus of claim 5 wherein the storage system comprises a plurality of distinct storage tiers and the storage controller is configured to move data blocks between the storage tiers based at least in part on the monitored counts.

13. The apparatus of claim 5 wherein the storage system comprises a cache memory and at least one non-cache storage tier and the storage controller is configured to move data blocks between the non-cache storage tier and the cache memory based at least in part on the monitored counts.

14. The apparatus of claim 1 wherein the given leaf node represents a data block having the particular block size and the splitting of the given leaf node results in n leaf nodes each representing a different portion of the data block and each having the same block size given by the particular block size divided by n.

15. A method comprising:

establishing an initial assignment of a plurality of counters to respective leaf nodes of a tree structure where each such leaf node represents a particular block size;

monitoring count values of respective ones of the counters assigned to the respective leaf nodes;

splitting at least a given one of the leaf nodes into multiple leaf nodes, each leaf node of the multiple leaf nodes representing a same block size smaller than the particular block size, responsive to the monitored count value for the corresponding counter of the given leaf node exceeding a split threshold, the given leaf node thereby being transformed into a non-leaf parent node of the multiple leaf nodes; and modifying the initial assignment of the plurality of counters to the leaf nodes responsive to the splitting;

wherein the method is implemented by at least one processing device comprising a processor coupled to a memory.

16. The method of claim 15 further comprising:

merging the multiple leaf nodes responsive to each of their monitored counts being below a merge threshold, the non-leaf parent node thereby being transformed back into the given leaf node that had been previously split into the multiple leaf nodes; and modifying the initial assignment of the plurality of counters to the leaf nodes responsive to the merging.

17. The method of claim 15 wherein splitting at least a given one of the leaf nodes into multiple leaf nodes comprises splitting the given leaf node into multiple leaf nodes responsive to a corresponding data block having the particular block size being accessed more than a specified number of times within a specified period of time.

18. A computer program product comprising a non-transitory processor-readable storage medium having stored therein program code of one or more software programs, wherein the program code when executed by at least one processing device causes said at least one processing device:

to establish an initial assignment of a plurality of counters to respective leaf nodes of a tree structure where each such leaf node represents a particular block size;

to monitor count values of respective ones of the counters assigned to the respective leaf nodes;

to split at least a given one of the leaf nodes into multiple leaf nodes, each leaf node of the multiple leaf nodes representing a same block size smaller than the particular block size, responsive to the monitored count value for the corresponding counter of the given leaf node exceeding a split threshold, the given leaf node thereby being transformed into a non-leaf parent node of the multiple leaf nodes; and to modify the initial assignment of the plurality of counters to the leaf nodes responsive to the splitting.

19. The computer program product of claim 18 wherein the program code when executed by said at least one processing device further causes said at least one processing device:

to merge the multiple leaf nodes responsive to each of their monitored counts being below a merge threshold, the non-leaf parent node thereby being transformed back into the given leaf node that had been previously split into the multiple leaf nodes; and to modify the initial assignment of the plurality of counters to the leaf nodes responsive to the merging.

20. The computer program product of claim 18 wherein splitting at least a given one of the leaf nodes into multiple leaf nodes comprises splitting the given leaf node into multiple leaf nodes responsive to a corresponding data block having the particular block size being accessed more than a specified number of times within a specified period of time.

\* \* \* \* \*